(No Model.) 2 Sheets—Sheet 1.
E. S. KEELER.
WHEELED CULTIVATING MACHINE.
No. 548,642. Patented Oct. 29, 1895.
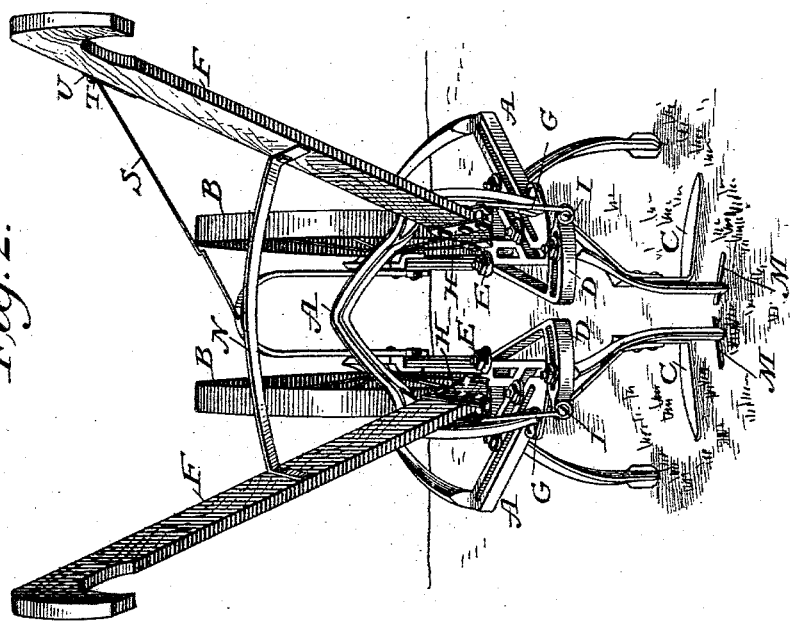
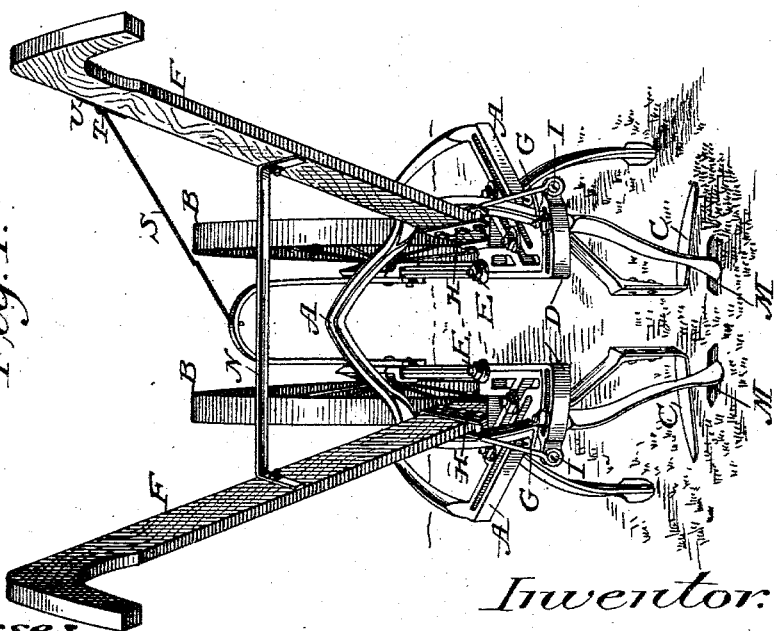
Witnesses.
Chas D Welch
Willie D Welch
Inventor.
Elisha S Keeler
per Henry Keeler
Attorney (No Model.) 2 Sheets—Sheet 2.
E. S. KEELER.
WHEELED CULTIVATING MACHINE.
No. 548,642. Patented Oct. 29, 1895.
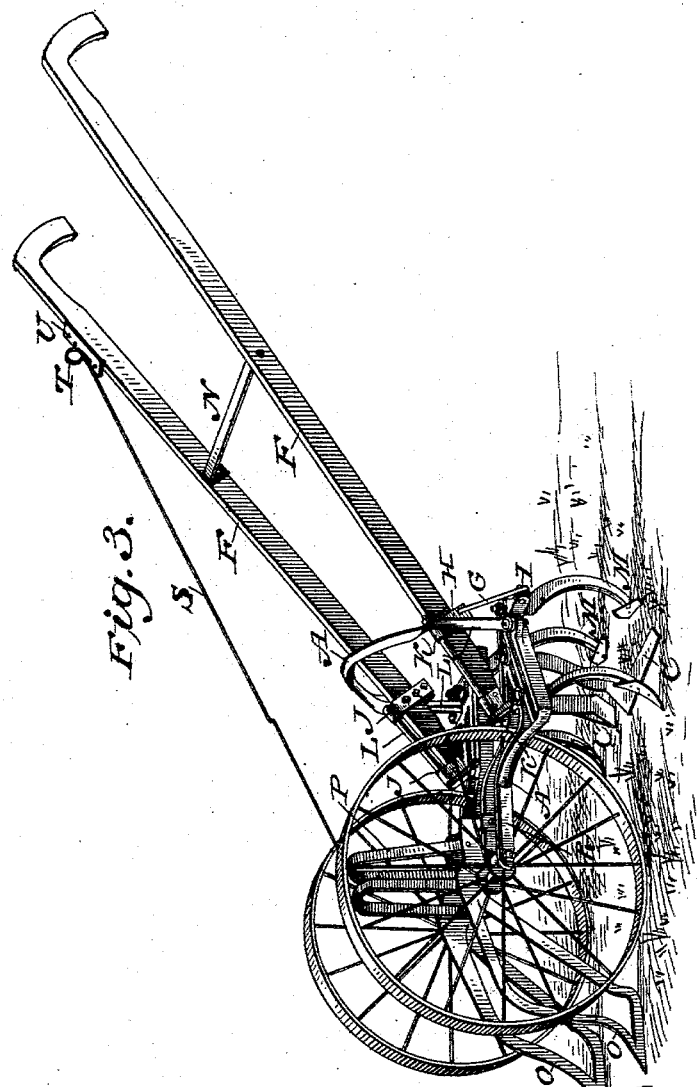
Witnesses
Chas D Welch
Willie Webb
Inventor
Elisha S Keeler
per Henry Keeler
Attorney

UNITED STATES PATENT OFFICE.

ELISHA S. KEELER, OF TOPEKA, KANSAS.

WHEELED CULTIVATING-MACHINE.

SPECIFICATION forming part of Letters Patent No. 548,642, dated October 29, 1895.

Application filed July 1, 1895. Serial No. 554,664. (No model.)

*To all whom it may concern:*

Be it known that I, ELISHA S. KEELER, a citizen of the United States, residing at Topeka, in the county of Shawnee and State of Kansas, have invented a new and useful Wheeled Cultivating-Machine, of which the following is a specification.

My invention relates to improvements in wheeled cultivating-machines in which supplementary frames operate in conjunction with handles hinged longitudinally to the main frame of a wheeled cultivating-machine and a leaf-lifter, which may be conveniently raised from the ground while turning the machine around at the end of a row; and the objects of my improvements are, first, to provide convenient machinery by which the operator of a cultivating-machine may cause a pair of hoes or plows attached to the machine to approach to or recede from each other; second, to provide convenient machinery by which such operator may cause a pair of hoes or plows to cut the surface of the ground either along the center of the row he is cultivating or only along the sides of the row, as he may from time to time desire; third, to provide machinery to accomplish the foregoing purposes by partial revolutions of the handles of the machine on axes parallel to such handles, whereby the operator's control over the movement of the machine by means of such handles is in no way impaired, and, fourth, to provide a means by which the operator, while turning the machine around at the end of a row, may conveniently raise from the ground both the leaf-lifter and the hoes at the same time. I attain these objects by the mechanism illustrated in the accompanying drawings, in which—

Figure 1 is a rear perspective view of the entire machine, with the hoes in position to cut the surface of the ground along the sides only of the row. Fig. 2 is a rear perspective view of the entire machine, with the hoes in position to cut the surface of the ground to the center of the row; and Fig. 3 is a lateral perspective view of the entire machine.

Similar letters refer to similar parts throughout the several views.

A is the main frame of a wheeled cultivator.

B are the wheels upon which the cultivator runs.

C are the hoes attached to the main frame.

D are supplemental frames hung to the main frames by the perpendicular pivots E. These supplemental frames are also hung to the handles F by the connecting-rods G, the horizontal pivots H, and the horizontal pivots I. The axes of the pivots H are perpendicular to the handles F, and the axes of the pivots I are at right angles with the axes of the pivots H.

The handles F are hung to the main frame A by hinges J and K. These hinges are formed of iron straps rigidly attached to the handles and extending from the upper edge of the handles to and around the rods L, which rods serve as pivots for these hinges. These rods are rigidly attached to the main frame A and are parallel with the handles.

The hoes M are rigidly fixed to the supplemental frames D in such positions as may be desired by securing the shanks of these hoes in grooves in said supplemental frames.

The handles F are connected to each other by a cross-piece N, which is made of flat spring-steel and serves as a spring to throw the handles back into the position shown in Fig. 1 whenever the operator ceases to hold them in the position shown in Fig. 2.

O are the arms of the leaf-lifter, and P is an arched bar which rigidly connects the rear ends of these arms. The arms O are hung to the main frame A by horizontal pivots R. A small rod S is attached to the top of the arched bar P and extends back and hooks into either of two holes T U in one of the handles F. When the rod S is hooked into hole T, the front ends of the arms O will be at the surface of the ground; but when hooked into hole U said arms will be thereby held considerably above the surface of the ground.

In operating my said machine the operator lets the handles remain in the position shown in Fig. 1 so long as he desires to cut the surface of the ground along the sides only of the row; but whenever he from time to time desires to cut the surface of the ground to the center of the row he turns the lower edge of the handles toward each other, as shown in Fig. 2. When he is cultivating a row planted in hills, he holds the handles in the latter position, except while the hoes are passing a hill.

When the operator has reached the end of a row and desires to turn the machine around onto the next row, he hooks the rear end of the rod S into the hole U, thereby raising the points of the arms O, so that by raising the handles F he may lift the hoes out of the ground without having the leaf-lifter stick into the ground and thereby obstruct his progress.

I am aware that prior to my invention supplemental frames of a wheeled cultivating-machine have been made pivotally attached to the main frame and attached to the handles of the machine, and I do not claim such combination broadly.

What I do claim as my invention, and desire to secure by Letters Patent, is—

1. In a wheeled cultivating machine, the combination of handles F, hung to the main frame A by hinges J and K the axes of which are parallel with the handles, with supplemental frames D, pivotally hung to the handles and pivotally hung to the main frame, for the purposes and substantially as hereinbefore described.

2. In a wheeled cultivating machine, the combination of the rods L, fixed to the main frame A in a position parallel with the handles F, with hinges J and K, projecting from and fixed to the upper edge of said handles, for the purposes and substantially as hereinbefore described.

3. In a wheeled cultivating machine, the combination of the connecting rods G, pivoted at their ends by pivots H and I at right angles to each other, with the handles F and the supplemental frames D, for the purposes and substantially as hereinbefore described.

4. In a wheeled cultivating machine, the combination of a leaf lifter, composed of arms O hung pivotally to the main frame and rigidly connected together by the arched bar P, with a rod S, extending from the top of the arched bar P, and hooking into either of two holes in one of the holes F, for the purposes and substantially as hereinbefore described.

5. In a wheeled cultivating machine, the combination of the main frame A, the supplemental frames D, the handles F, the rods L, the hinges J and K, the connecting rods G, the pivots H and I, the hoes M, the elastic cross piece N and the pivots E, for the purposes and all substantially as hereinbefore described.

ELISHA S. KEELER.

Witnesses:
HENRY KEELER,
R. B. WELCH.